Sept. 15, 1970            I. KAMLUKIN            3,528,323
DIFFERENTIAL TRANSMISSION FOR COAXIAL AXLE SHAFTS WITH MEANS
TO FRICTIONALLY RESIST RELATIVE ROTATION THEREBETWEEN
Filed July 19, 1968            4 Sheets-Sheet 4
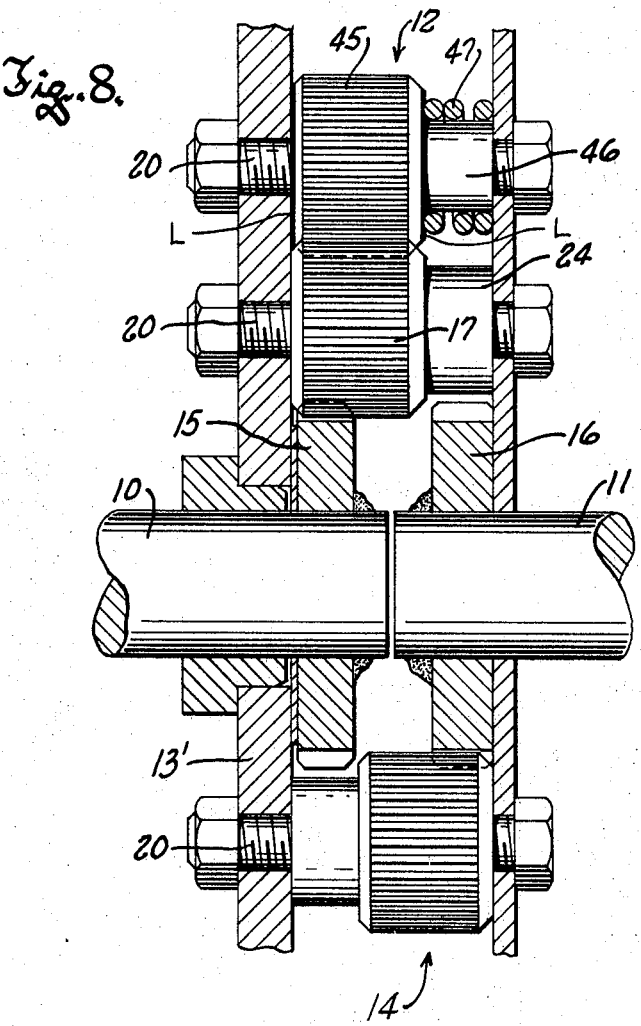
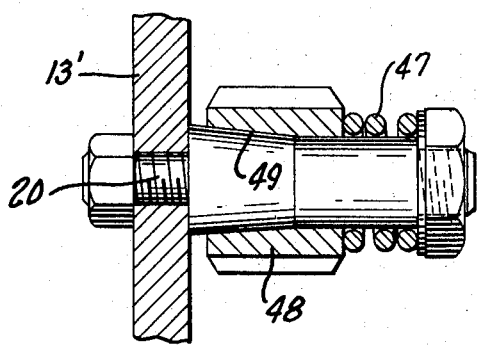

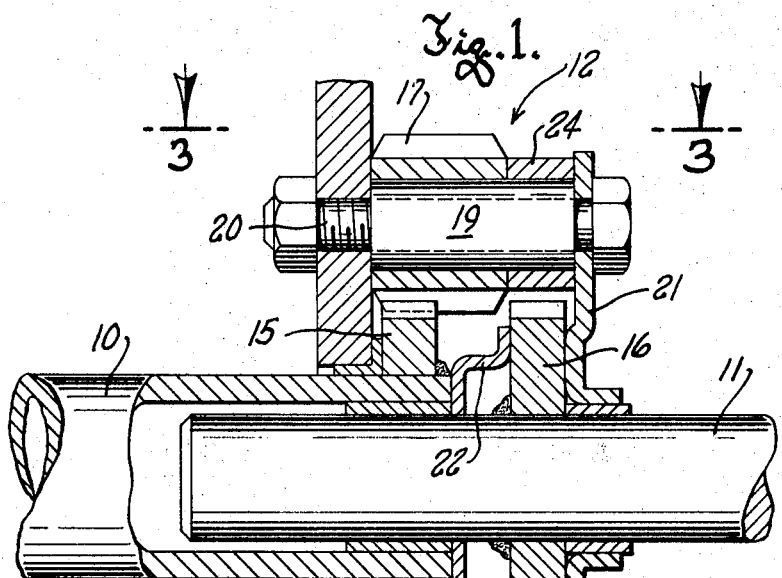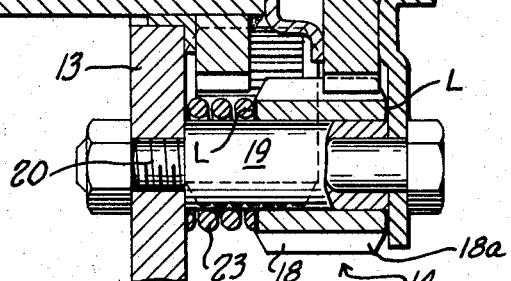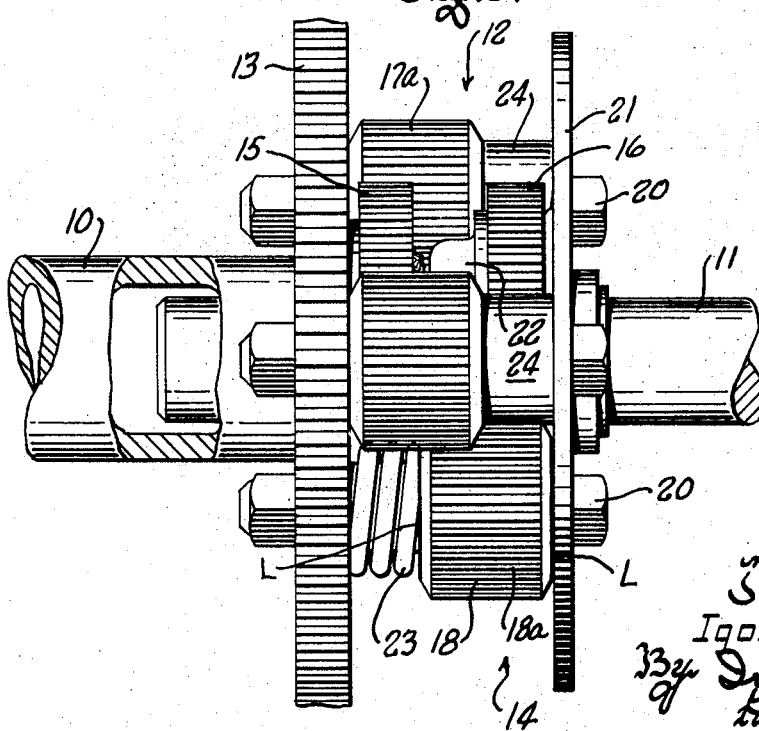

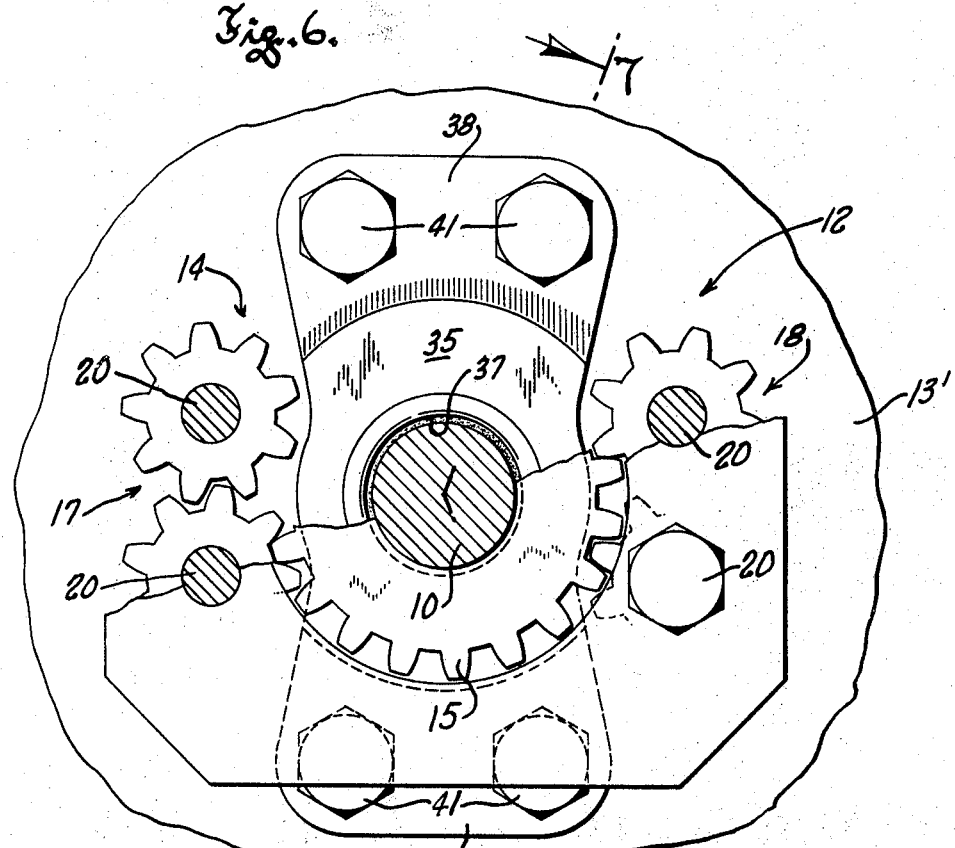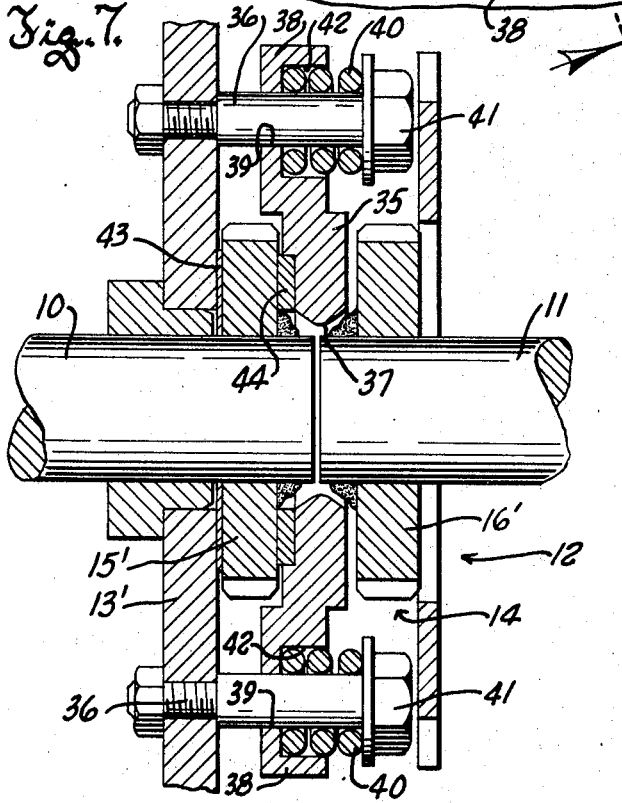

United States Patent Office 3,528,323
Patented Sept. 15, 1970

3,528,323
DIFFERENTIAL TRANSMISSION FOR COAXIAL AXLE SHAFTS WITH MEANS TO FRICTIONALLY RESIST RELATIVE ROTATION THEREBETWEEN
Igor Kamlukin, Milwaukee, Wis., assignor to Simplicity Manufacturing Company, Inc., Port Washington, Wis., a corporation of Wisconsin
Filed July 19, 1968, Ser. No. 754,520
Int. Cl. F16h *1/44, 1/42*
U.S. Cl. 74—710.5                                6 Claims

ABSTRACT OF THE DISCLOSURE

A differential transmission of the spur gear type and also the bevel gear type to transmit torque to coaxial axle shafts, having friction means incorporated therein to resist free spinning of one of the axle shafts with respect to the other.

---

This invention relates to differential transmissions and especially to such transmissions designed for use in riding tractors of the type disclosed in the Kamlukin Pat. No. 3,311,186.

The purpose and object of the invention is to incorporate in a differential transmission, whether it be of the spur gear type or the bevel gear type, simple and reliable means for preventing free spinning of one of the driven shafts with respect to the other, without interfering with the normal differential capability of the transmission.

SUMMARY

In accordance with this invention, a differential transmission for transmitting power to a pair of coaxial axle shafts and having power input means through which the transmission is connectable with a source of power, and gear means comprising planetary gearing drivingly connecting the axle shafts with the power input means, has spring loaded brake means embodied therein. The brake means comprises one or more pairs of frictionally engaged surfaces, one of each pair being constrained to travel with the power input means and the other of each pair to rotate with one of two meshing gears of the gear means. The selected gear may be one of the gears of the planetary gearing or an idler meshing with one of the gears of the planetary gearing. In either case, the braking effect resulting from the spring produced frictional engagement of these surfaces resists relative rotation of the axle shafts and hence assures against free spinning of one shaft while the other remains stationary.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

The drawings illustrate several complete examples of the physical embodiments of the invention constructed according to the best modes so far devised for the practical application of the principles thereof, and in which:

FIG. 1 is a longitudinal sectional view through a spur gear type differential transmission embodying this invention, said view being take on the planes of the line 1—1 in FIG. 2;

FIG. 2 is an end view of the transmission, with parts broken away and in section;

FIG. 3 is a top view of the transmission taken substantially on the plane of the line 3—3 in FIG. 1;

FIGS. 4 and 5 are longitudinal sectional views through bevel gear type differential transmissions embodying this invention in two different forms;

FIG. 6 is an end view of a spur gear type differential transmission similar to that of FIG. 1, but equipped with a modified form of the invention;

FIG. 7 is a sectional view through FIG. 6 on the planes of the line 7—7, but with part of the gearing of the transmission omitted for clarity;

FIG. 8 is a longitudinal sectional view through a transmission similar to the one shown in FIG. 1, but illustrating a modification thereof characterized by the fact that an idler gear is employed as one of the elements of the brake; and FIG. 9 is a longitudinal sectional view through one of the gears illustrating an especially effective way of achieving the frictional braking effect by which the invention achieves its purpose.

Referring to the drawings, the numerals 10 and 11 designate a pair of coaxial axial shafts which are adapted to have wheels mounted thereon as in the aforesaid Kamlukin Pat. No. 3,311,186. In the embodiment of the invention illustrated in FIGS. 1, 2 and 3, one of the axle shafts is tubular and the other solid, the latter projecting into the former. In all other embodiments of the invention, both shafts are solid and axially spaced from one another.

In all embodiments of the invention illustrated, power is transmitted to the axle shafts through a differential transmission indicated generally by the numeral 12. In FIGS. 1, 2 and 3, the differential transmission is of the spur gear type and comprises a main gear 13 which is rotatable about the common axis of the axle shafts, both with and with respect thereto. Gear means designated generally by the numeral 14 drivingly connects the main gear with the axle shafts. The gear means 14 comprises planetary gearing including a pair of sun gears 15 and 16 respectively fixed to the shafts 10 and 11, and two pairs of planet gears 17 and 18. One of the planet gears of each pair meshes with one of the sun gears and the other of each pair of planet gears meshes with the other sun gear. In addition, the planet gears of each pair mesh with one another, for which purpose the planet gears are longer than the sun gears.

All of the planet gears are carried by the main gear 13, being journalled on sleeves 19 that are slipped onto tie bolts 20 by which the main gear 13 and a disc 21 are connected in spaced coaxial relationship therewith, the sleeves 19 serving to space the disc from the main gear. The main gear 13 together with the disc 21 and the tie bolts connecting them thus constitutes a power input means through which the transmission is connectable with a source of power, as illustrated in the aforesaid Kamlukin Pat. No. 3,311,186.

A spacer 22 interposed between the inner end of the shaft 10 and the sun gear 16 holds the axle shafts and the sun gears properly spaced with respect to one another.

The structure thus far described constitutes a conventional spur gear differential transmission which heretofore has been subject to the disadvantages of permitting one axle shaft and the wheel mounted thereon to spin while the other stands still. To eliminate this objectionable possibility, brake means are incorporated in the transmission. As is well known, as long as the gears of the planetary system do not rotate with respect to one another, the driven axle shafts rotate in unison with the power input means, specifically the main gear 13. However, if the gears are unrestrictedly free to rotate relative to one another, any significant loss of traction at one of the wheels results in that wheel spinning freely while the other stands still.

In accordance with this invention, however, the differential transmission incorporates brake means to frictionally resist relative rotation between the gears of the planetary system and thereby greatly minimizes the likelihood of losing traction due to free spinning of one of the axle shafts. This frictional brake means, as shown in FIGS. 1, 2 and 3 may consist simply of frictionally engaged surfaces on one or more of the planet gears and a part which travels with the power input means, which as noted hereinbefore comprises main gear 13, the disc 21 and the tie bolts connecting them.

Thus, as best seen in FIG. 1, there are at least two pairs of such frictionally engaged surfaces depicted by the heavy lines L. One of these is provided by a part of the inner face of the disc 21 and the adjacent end of one of the planet gears 18, specifically the gear 18a which meshes with the sun gear 16. The other may consist of the opposite end of the planet gear 18a and the adjacent end of a spring 23 confined between the planet gear 18a and the inner face of the main gear 13; or, if the spring turns with the gear, the opposite end of the spring and the inner face of the main gear 13. The spring, of course, maintains these surfaces in frictional engagement, and needless to say, the braking effect derived from the spring force exerted upon the gear 18a may be duplicated at another of the planet gears. Thus, as shown in FIG. 3, one of the pair of meshing planet gears 17, specifically the gear 17a which meshes with the sun gear 15, may be spring pressed against the main gear 13. Obviously, in each case the magnitude of the braking effect derived from the frictionally engaging surfaces depends upon the coefficient of friction of the surfaces and the force produced by the springs 23; and since the spring force depends upon the selection of the springs used, the braking effect introduced into the transmission can be easily tailored to the requirements of the equipment for which the transmission is designed; and where the transmission is of the spur gear type, the selected braking effect remains constant and is in nowise dependent upon the load on the driven axle shafts.

Any relative rotation between the axle shafts 10 and 11 entails rotation of the gears 17a and 18a about their axes; hence it follows that the resistance to such rotation offered by the frictional engagement between the ends of these gears and the surfaces in contact therewith, and which travel with the power input means, introduces a drag into the system that resists relative rotation between the axle shafts.

Preferably the frictionally engaged surfaces are hardened to reduce wear.

A characteristic of the structure illustrated in FIGS. 1, 2 and 3, is that the main gear 13, the disc 21 and the tie bolts connecting them cooperate to form a cage in which the planet gearing is located. The planet gears which are not spring biased are held in their proper axial positions by spacer collars 24.

As illustrated in FIGS. 4 and 5, the invention is adaptable to bevel gear type differential transmissions. In this case the power input means comprises either a bevel type ring gear 25, as in FIG. 4, or a spur type ring gear 26, as in FIG. 5, confined between and secured to opposed cup-shaped hub members 27 each having one of the axle shafts 10'-11' journalled therein. In each instance, the ring gear and hub members coact to form a housing for the planetary gearing which includes a bevel type sun gear (15'-16') fixed to each of the axle shafts and a pair of axially spaced bevel type planet gears 28 meshing with both sun gears. The planet gears 28 in each case are coaxial and carried by the ring gear (25-26) of the power input means. In FIG. 4, the planet gears are mounted on individual stub shafts 29, but in FIG. 5 a common shaft 30 has both planet gears journalled thereon.

In FIG. 4, there are at least two pairs of frictionally engaged surfaces, designated by the heavy lines L. They are on the sun gears 15'-16' and the adjacent inner faces of the hubs 27. These mating surfaces are held in frictional engagement by a spring 31 interposed between the sun gears; and, if desired, the contact between the ends of this spring and the sun gears can be used to further resist relative rotation of the gears.

In FIG. 5, the mating frictionally engaged surfaces, again designated by the heavy lines L, are on the planet gears and the adjacent portions of the ring gear 26. These mating surfaces are maintained in frictional engagement by a spring 32, the coils of which encircle the common shaft 30, and since the ends of the spring 32 bear directly against the planet gears, the braking effect resulting from the frictional engagement of the mating surfaces is augmented by the engagement of the ends of the spring with the planet gears.

In the bevel gear type transmissions of FIGS. 4 and 5, the tendency of the gears to separate under load will increase the force with which the mating surfaces on the gears and the power input means are engaged, and thus will add to the magnitude of the braking effect. This possibility may be taken into account when selecting the strength of the spring, but since the minimum braking action is determined by the strength of the spring, the designer is freed from dependence upon unpredictable forces in achieving the purposes of this invention.

The embodiment of the invention illustrated in FIGS. 6 and 7, like that of FIGS. 1, 2 and 3, utilizes a spur gear type differential, but in this case the manner in which the frictional braking effect is accomplished is substantially different. In this case, the main gear 13' carries a pressure applying unit 35 which is mounted on four studs 36 fixed to the main gear 13' for movement axially toward and from the main gear. The pressure applying unit 35 partakes of some of the aspects of a spider in that it has a central hole 37 to accommodate the adjacent inner ends of the axle shafts, and oppositely extending arms 38 each of which has two guide holes 39 in which the studs 36 are slidably received.

Compression springs 40 confined between the heads 41 of the studs 39 and the bottom of cup-shaped sockets 42 formed on the arms 38, yieldingly press the pressure applying unit 35 toward the main gear 13' and, in so doing, cause the adjacent sun gear 15' to be clamped between the main gear 13' and the pressure applying unit.

Frictional engagement thus exists between the sun gear 15' and the main gear 13' and between the sun gear and the hub portion of the pressure applying unit; and if desired, brake discs 43 and 44 may be incorporated between these surfaces to increase the braking effect.

In all embodiments of the invention thus far described, at least one of the mating frictionally engaged surfaces is on one of the gears of the planetary gearing. It is possible, however, to have the gear-carried surface or surfaces on an extra idler gear which does not constitute part of the planetary system, and in FIG. 8 this possible modification of the invention is illustrated. In this case, an idler gear 45 is freely journalled on a sleeve 46 similar to the sleeves 19 upon which the planet gears 17 and 18 are journalled. The idler gear 45 meshes with one of the planet gears 17 and a spring 47 confined between the gear 45 and the disc 21 yieldingly presses the end of the gear 45 against the adjacent face of the main gear 13'.

Ordinarily, the braking effect of frictional engagement between the end faces of a gear and an adjacent surface provides sufficient drag, but if greater drag is necessary it can be obtained by incorporating taper in the mounting of one of the gears. Thus, as shown in FIG. 9, a portion of the shaft or stud on which the gear 48 is mounted and the part of the bore of the gear in which it is received, are tapered, as at 49.

As will be readily apparent, while conventional coil springs have been illustrated and perhaps are the most logical choice, Belleville type spring washers could be substituted for these coil springs.

From the foregoing description taken in connection with the accompanying drawings, it will be readily apparent to those skilled in the art that this invention provides a simple, highly effective way of deriving a significant degree of positiveness in the driving torque delivered to a pair of coaxial independent axle shafts by means of a differential transmission.

It will also be evident that an especially significant advantage of the invention resides in the fact that the minimum braking effect incorporated in the transmission can be predetermined and is not dependent upon unpredictable forces which vary with the load.

What is claimed as my invention is:

1. A differential transmission to transmit power to a pair of coaxial axle shafts, having provision for preventing free relative rotation of the shafts, comprising:
   (A) power input means through which the transmission is connectible with a source of power,
      said power input means being rotatable about the common axis of said axle shafts with and with respect thereto, and comprising a spur gear and a disc mounted on the spur gear in spaced parallel coaxial relation therewith;
   (B) gear means comprising planetary gearing drivingly connecting the shafts with the power input means to drive the shafts in unison as long as the gears of said planetary gearing do not rotate with respect to one another and the power input means,
      said planetary gearing being located between the spur gear and said disc;
   (C) brake means reacting between one of two meshing gears of said gear means and the power input means,
      said brake means comprising frictionally engaged surfaces, one of which is on said disc and the other of which is constrained to rotate with said one gear, the frictional engagement of said surfaces resisting relative rotation of the axle shafts; and
   (D) spring means maintaining said surfaces in frictional engagement.

2. A differential transmission to transmit power to a pair of coaxial axle shafts, having provision for preventing free relative rotation of the shaft, comprising:
   (A) power input means through which the transmission is connectible with a source of power,
      said power input means being rotatable about the common axis of said axle shafts with and with respect thereto, and comprising a spur gear and a disc mounted on the spur gear in spaced parallel coaxial relation therewith;
   (B) gear means comprising planetary gearing drivingly connecting the shafts with the power input means to drive the shafts in unison as long as the gears of said planetary gearing do not rotate with respect to one another and the power input means,
      said planetary gearing being located between the spur gear and said disc;
   (C) brake means reacting between one of two meshing gears of said gear means and the power input means,
      said brake means comprising frictionally engaged surfaces, one of which is on said spur gear and the other of which is constrained to rotate with said one gear, the frictional engagement of said surfaces resisting relative rotation of the axle shafts; and
   (D) spring means maintaining said surfaces in frictional engagement.

3. A differential transmission to transmit power to a pair of coaxial axle shafts, having provision for preventing free relative rotation of the shafts, comprising:
   (A) power input means through which the transmission is connectible with a source of power,
      said power input means being rotatable about the common axis of said axle shafts with and with respect thereto, and comprising a ring gear fixed between a pair of hubs in which the axle shafts are freely rotatably received and which hubs coact with the ring gear to define a housing;
   (B) gear means comprising planetary gearing disposed in said housing and drivingly connecting the shafts with the power input means to drive the shafts in unison as long as the gears of said planetary gearing do not rotate with respect to one another and the power input means, said planetary gearing including
      (1) a bevel type sun gear fixed on each axle shaft,
      (2) a pair of bevel type planet gears meshing with the sun gears,
      (3) and a common shaft upon which said planet gears are freely rotatably mounted, said common shaft extending diametrically across the interior of the ring gear and being carried thereby;
   (C) brake means reacting between one of two meshing gears of said gear means and the power input means,
      said brake means comprising frictionally engaged surfaces on the planet gears and on the ring gear resisting relative rotation of the axle shafts;
   (D) and a compression spring encircling said common shaft and confined between the planet gears to maintain said brake means operative.

4. A differential transmission to transmit power to a pair of coaxial axle shafts, having provision for preventing free relative rotation of the shafts, comprising:
   (A) power input means through which the transmission is connectible with a source of power,
      said power input means being rotatable about the common axis of said axle shafts with and with respect thereto;
   (B) gear means comprising planetary gearing drivingly connecting the shafts with the power input means to drive the shafts in unison as long as the gears of said planetary gearing do not rotate with respect to one another and the power input means;
   (C) brake means reacting between one of two meshing gears of said gear means and the power input means,
      said brake means comprising frictionally engaged surfaces, one of which is constrained to travel with the power input means and the other to rotate with said one gear,
         the frictional engagement of said surfaces resisting relative rotation of the axle shafts;
   (D) spring means maintaining said surfaces in frictional engagement;
   (E) said one gear comprising an idler gear in mesh with one of the gears of the transmission gearing;
   (F) a shaft fixed to part of the power input means and having said idler mounted thereof;
   (G) said frictionally engaged surfaces comprising tapered portions of said shaft and the bore in the idler gear;
   (H) and said spring means reacting between a shoulder on the shaft and the adjacent end of the idler gear.

5. A differential transmission to transmit power to a pair of coaxial axle shafts, having provision for preventing free relative rotation of the shafts, comprising:
   (A) power input means through which the transmission is connectible with a source of power, said power input means being rotatable about the common axis of said axle shafts with and with respect thereto, and comprising main and disc members, and means including bolts connecting said members together in spaced relation along the axis of the shafts;
   (B) gear means comprising planetary gearing drivingly connecting the shafts with the power input means to drive the shafts in unison as long as the gears of the planetary gearing do not rotate with respect to one another and to the power input means,
      said planetary gearing being located between said members and including planet gears carried by said bolts;
   (C) and means by which relative rotation of the axle shafts is yieldingly resisted, comprising a spring encircling one of said bolts and confined under compression between one of said members of the power input means and the planet gear on said one bolt, so that the expensive force of said spring is utilized to hold a surface on said last named gear in frictional engagement with a surface on the other of said members.

6. A differential transmission to transmit power to a pair of coaxial axle shafts, having provision for preventing free relative rotation of the shafts, comprising:

(A) power input means through which the transmission is connectible with a source of power, said power input means being rotatable about the common axis of said axle shafts with and with respect thereto;

(B) gear means comprising planetary gearing drivingly connecting the shafts with the power input means to drive the shafts in unison as long as the gears of said planetary gearing do not rotate with respect to one another and the power input means;

(C) brake means reacting between one of two meshing gears of said gear means and the power input means, said brake means comprising frictionally engaged surfaces, one of which is constrained to travel with the power input means and the other to rotate with said one gear, the frictional engagement of said surfaces resisting relative rotation of the axle shafts;

(D) spring means maintaining said surfaces in frictional engagement;

(E) said power input means including a main gear having a hub in which one of said axle shafts is received;

(F) said planetary gearing including a spur type sun gear fixed on each of said axle shafts, and planet gears certain of which mesh with one another and certain of which mesh with the sun gears, one of said sun gears overlying the hub portion of the main gear;

(G) said brake means comprising a clamping member slidably mounted on studs fixed to and projecting from the main gear and by which the clamping member is constrained to turn with the main gear, the clamping member overlying said one sun gear, so that the latter is confined between the main gear and the clamping member;

(H) said frictionally engaged surfaces being on the clamping member, said one sun gear and the main gear; and (I) said spring means comprising compression springs mounted on the studs and confined between the clamping member and shoulders on the studs to urge the clamping member towards the main gear and clamp said one sun gear therebetween.

References Cited

UNITED STATES PATENTS

| | | | |
|---|---|---|---|
| 3,060,765 | 10/1962 | Rinsoz | 74—710.5 |
| 3,097,545 | 7/1963 | Immel | 74—711 |
| 3,186,258 | 6/1965 | Meldola | 74—710.5 |
| 3,233,477 | 2/1968 | O'Brien | 74—710.5 |
| 3,260,134 | 7/1966 | Bowen et al. | 74—710.5 |

LEONARD H. GERIN, Primary Examiner

U.S. Cl. X.R.

74—714